Fig. 1

C. J. LYSAGHT.
MACHINE FOR CUTTING AND TRIMMING THE EDGES OF CORNER PIECES.
APPLICATION FILED OCT. 9, 1908.

939,144.

Patented Nov. 2, 1909.
5 SHEETS—SHEET 2.

WITNESSES:

INVENTOR:
Cornelius J. Lysaght,
BY
Fraentzel and Richards
ATTORNEYS

C. J. LYSAGHT.
MACHINE FOR CUTTING AND TRIMMING THE EDGES OF CORNER PIECES.
APPLICATION FILED OCT. 9, 1908.

939,144.

Patented Nov. 2, 1909.

INVENTOR:
Cornelius J. Lysaght,
BY
Fraentzel and Richards,
ATTORNEYS

C. J. LYSAGHT.
MACHINE FOR CUTTING AND TRIMMING THE EDGES OF CORNER PIECES.
APPLICATION FILED OCT. 9, 1908.

939,144.

Patented Nov. 2, 1909.

WITNESSES:

INVENTOR:
Cornelius J. Lysaght,
BY
Fraentzel and Richards
ATTORNEYS

UNITED STATES PATENT OFFICE.

CORNELIUS J. LYSAGHT, OF NEWARK, NEW JERSEY, ASSIGNOR TO THE R. NEUMANN HARDWARE CO., A CORPORATION OF NEW JERSEY.

MACHINE FOR CUTTING AND TRIMMING THE EDGES OF CORNER-PIECES.

939,144.     Specification of Letters Patent.     Patented Nov. 2, 1909.

Application filed October 9, 1908. Serial No. 456,877.

*To all whom it may concern:*

Be it known that I, CORNELIUS J. LYSAGHT, a citizen of the United States, residing at Newark, in the county of Essex and State of New Jersey, have invented certain new and useful Improvements in Machines or Apparatus for Cutting and Trimming the Edges of Corner-Pieces; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in cutting and trimming machines; and, the invention relates, more particularly, to a novel machine or apparatus which is especially adapted for cutting and trimming the rough edge-portions of that class of corner-pieces which are made from leather, or other suitable material, and which are used upon the corners of suit-cases, and the like.

The invention has for its principal object to provide a novel, simple, and effectively operating machine which is to be used for quickly and effectively cutting and trimming the rough edges of leather and other corner-pieces, of the hollow triangular configuration, the mechanism being arranged and operating in such a manner, that while the triangular corner-piece moves forward to be clamped, it also receives a revolving motion against the cutting edge of a knife, which has descended immediately after the corner-piece has been clamped, so as to successively move the marginal edges of the three sides of the corner-piece against said knife-edge, and thereby perfectly cut and trim the said edges.

Other objects of this invention not at this time more particularly enumerated will be clearly understood from the following detailed description of my present invention.

With the various objects of my present invention in view, the said invention consists, primarily, in the novel cutting and trimming machine hereinafter set forth; and, the invention consists, furthermore, in the novel arrangements and combinations of the various devices and parts, as well as in the details of the construction of the same, all of which will be hereinafter more fully described and then finally embodied in the clauses of the claim which are appended to and which form an essential part of this specification.

The invention is clearly illustrated in the accompanying drawings, in which:—

Similar characters of reference are employed in all of the above described views, to indicate corresponding parts.

Figure 4:
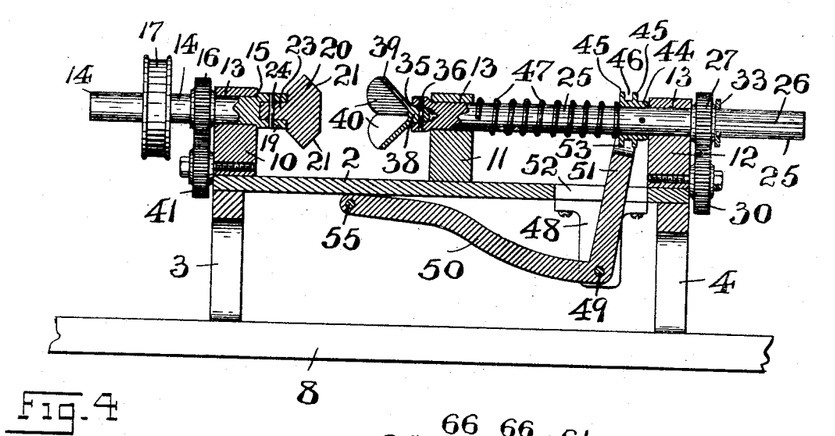
Fig. 4 is a longitudinal vertical section of the machine, said section being taken on line 4—4 in Fig. 1.

Referring now to the said drawings, the reference-character 1 indicates one complete form of cutting or trimming machine or apparatus embodying the principles of the present invention. The said machine comprises a suitable bed-plate 2 formed or provided at its end-portions with supports or standards 3 and 4, said standards being made with perforated ears or lugs 5 for the reception of suitable screws 7, or the like, for permanently securing the machine or apparatus in its fixed position upon the top of a suitable table or work-bench 8. Extending upwardly from the said bed-plate 2, and suitably secured thereon by means of screws 9, or similar fastening means, are three supports or standards 10, 11 and 12, each standard being provided with a bearing-portion 13, as will be clearly seen from an inspection of Figs. 4 and 8 of the drawings.

Figure 1:
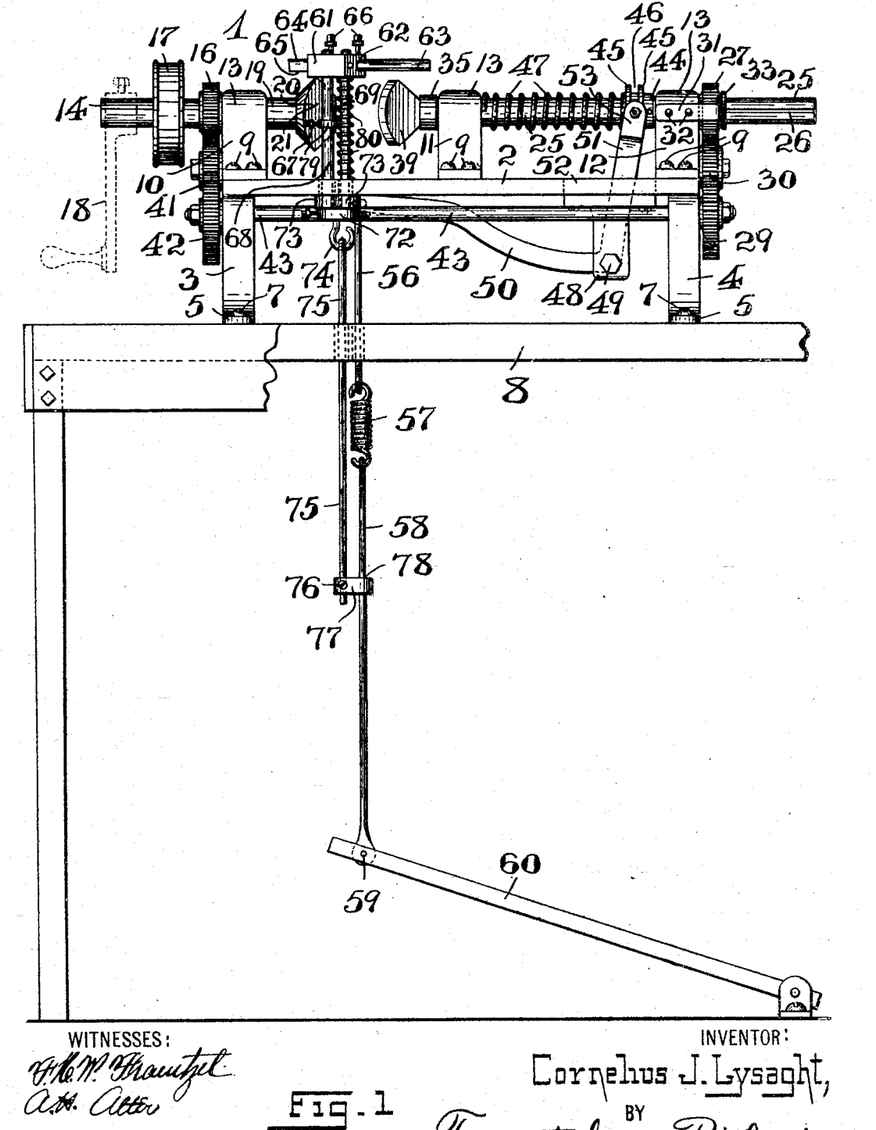
Figure 1 is a side elevation of a cutting or trimming machine embodying the principles of the present invention, and showing all the parts in their normal initial positions.
Figure 2:
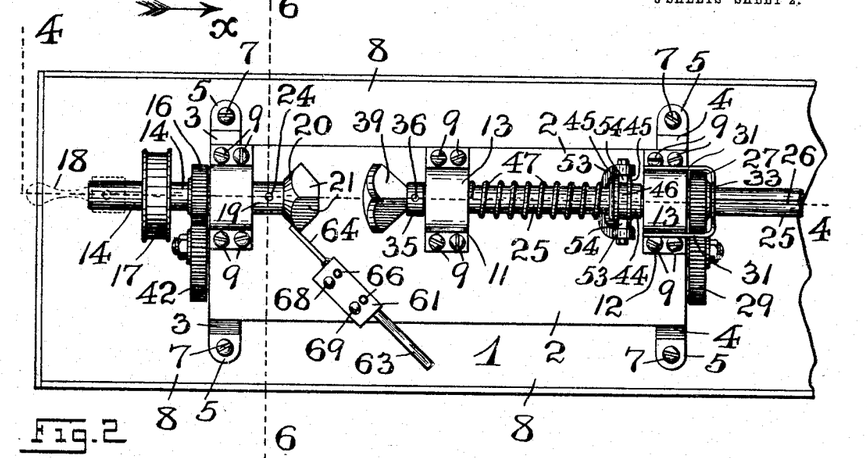
Fig. 2 is a top or plan view of the same.

Mounted in the bearing-portion of the standard or post 10 is a suitable spindle or shaft 14, retained against lateral displacement from said bearing-portion by an annular shoulder 15 and the hub of a gear-wheel 16 suitably secured upon said spindle or shaft, substantially as shown. The said spindle or shaft 14 is usually driven by power from a pulley 17, suitably mounted upon the spindle or shaft; or, the said shaft or spindle may be manually operated by means of a crank 18, indicated in dotted outline in Fig. 1 of the drawings, and as will be clearly understood from an inspection of said figure.

Upon the enlarged end-portion 19 of the said spindle or shaft 14 is a master or male member 20 for the support thereon of the triangular leather cornerpiece, the said member 20 being made with three angularly disposed sides or faces 21 corresponding to the interior configuration of the cornerpiece, thus providing a truncated pyramid, upon which the said cornerpiece can be easily fitted and made to register with the said master or male supporting member, as will be clearly evident. One manner of fastening said master upon the end-portion of the spindle or shaft 14 is by means of a stud or shank 22 which is fitted into a socket 23, the whole being secured against displacement by means of a pin 24. These parts may, however, be otherwise secured in their assembled and connected relations, as will be clearly evident.

Figure 9:
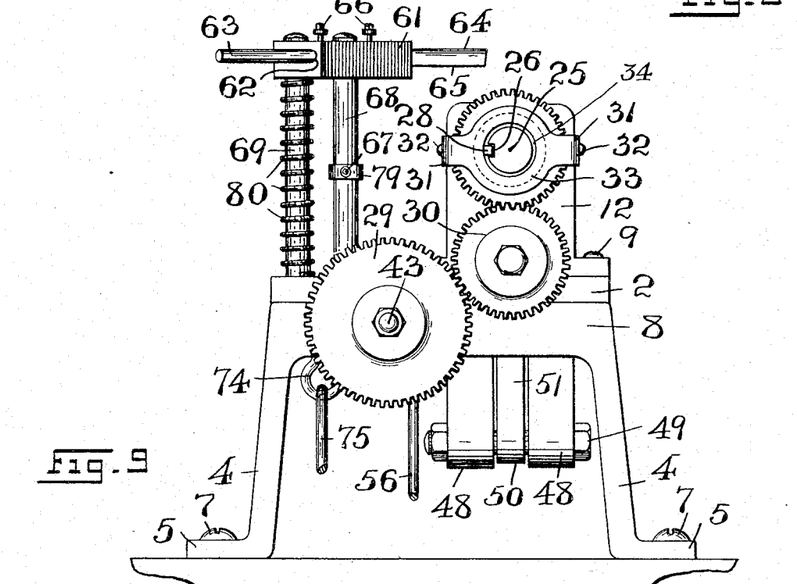
Fig. 9 is an elevation of the other end of the machine.

Mounted in the bearing-portions 13 of the standards or posts 11 and 12, so as to revolve therein, but being capable also of a longitudinal sliding movement, in the manner and for the purposes hereinafter more fully specified, is a shaft or spindle 25. This shaft is provided with a longitudinally extending slot or groove 26, and 27 is a driving gear for revolving said shaft. That the said spindle or shaft 25 can slide back and forth in the bearing-portions of the standards or posts 11 and 12, with the gear-wheel 27 operatively connected with said shaft, the tubular hub of the said gear-wheel 27 is loosely arranged upon the shaft 25, and is provided with a key 28 which projects into said slot or groove 26 in the side of the shaft 25, as clearly shown in Fig. 9 of the drawings. That the said gear-wheel 27 will remain in its fixed position with reference to a gear-wheel 29 and an idler 30, in mesh with both gears 27 and 29, a yoke or strap 31 is secured by means of pins or screws 32 to the sides of the support or post 12, the said yoke or strap 31 having an enlarged portion 33 which is provided with a hole or opening 34 through which the shaft or spindle 25 extends, substantially in the manner shown in said Fig. 9 of the drawings. In this manner, the gear-wheel 27 is at all times retained in its operative position, against lateral movement upon the shaft 25, by the sides of the support or post 12 and the strap or yoke, as will be clearly evident. The opposite end-portion of the said shaft or spindle 25 is made with a socket or receiving portion, as 35, into which is fitted and is secured therein by means of a pin 36, or other suitable fastening means, the shank or stem 38 of a female corner-piece clamping member or element 39, which is made with a hollow three-sided receiving portion 40, conforming to the three-sided truncated pyramidal shape of the master or male supporting member, so as to be fitted over and register with the male member when the shaft or spindle is moved in a forward direction in the manner and for the purposes to be hereinafter more fully described.

Figure 5:
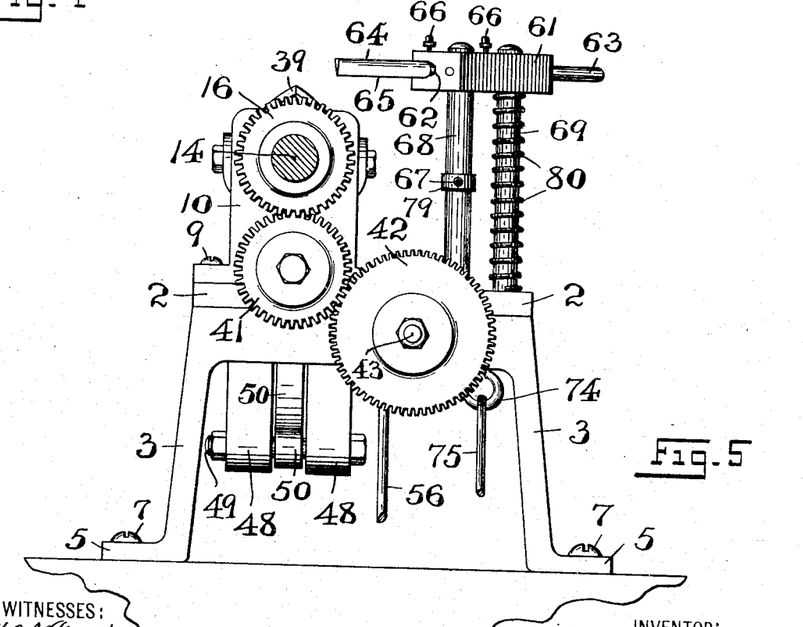
Fig. 5 is an elevation of one end of the machine, said view being made on an enlarged scale.

Referring now more particularly to Fig. 5 of the drawings, it will be seen that the gear-wheel 16 of the shaft or spindle 14 meshes with a toothed idler 41, and in mesh with this idler 41 is another gear-wheel 42 which is mounted upon a shaft 43. This shaft is rotatably mounted in bearing-portions in the standards or supports 3 and 4 beneath the bed-plate 2, said shaft 43 having mounted thereon the previously mentioned gear-wheel 29 which is in mesh with the idler 30.

As shown, the gears 16 and 27, the idlers 41 and 31, and the gears 42 and 29 are, respectively, of the same diameters, so that the rotative movements of the two shafts or spindles 14 and 25 will be in the same directions and at the same speeds, thus constantly insuring the perfect registration of the female member or element 39 with the master or male member 20, when the shaft or spindle 25 is moved in its forward direction. The said shaft or spindle 25 has secured thereon, at a suitable point between the two standards or posts 11 and 12, a sleeve or collar 44 formed with annular ribs 45 and an annular depression 46, and encircling the said shaft or spindle 25 between the support 11 and the sleeve or collar 44 is a coiled spring 47.

Figure 3:
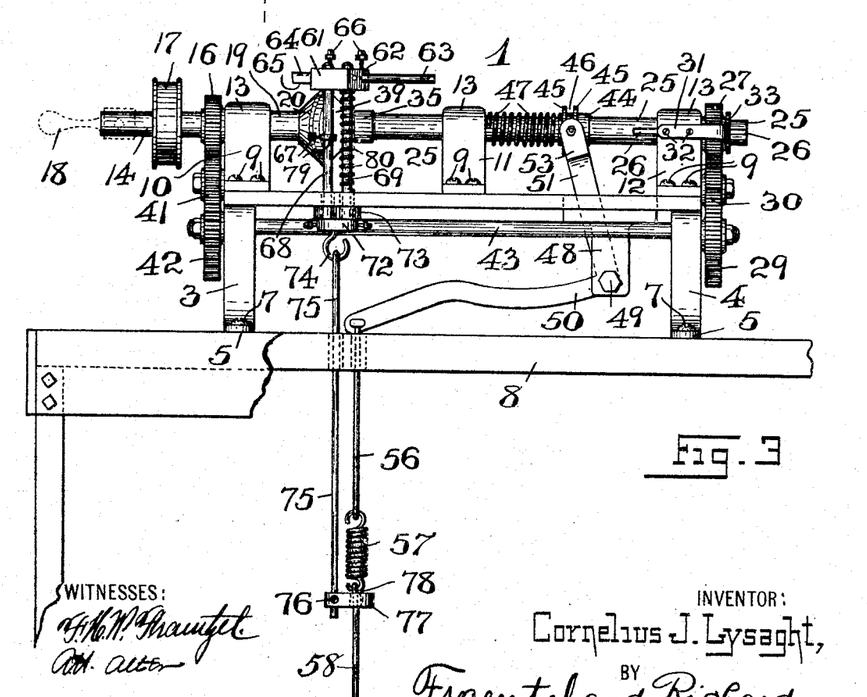
Fig. 3 is a view similar to that represented in Fig. 1 of the drawings, but illustrating the first movement or clamping-step of the apparatus, when a triangular corner-piece is held or clamped between the male and female supporting elements of the machine.

Suitably secured to the under surface of the bed-plate 2 are a pair of brackets 48, and pivoted upon a pin or bolt 49 extending across the lower portion of said brackets 48 is a bell-crank. This bell-crank comprises a forwardly extending arm or member 50 and an upwardly projecting arm or member 51, said arm or member 51 extending through a slot or elongated opening 52 in the bed-plate 2, and being provided at its free end with a yoke-shaped or bifurcated end-member 53 which is provided with pivotally arranged shoes or blocks 54 in operative engagement with the annular groove or depression 46 of the sleeve or collar 44. Extending laterally from the free end-portion of the arm or member 51 of the bell-crank is a bar or rod 55, and attached to said bar or rod, in any suitable manner, is a link or rod 56. This link extends in a downward direction through a suitable opening in the table or work-bench 8, for a short distance below the table, and has connected with its lower portion one end of a suitably coiled spring 57, said spring being of greater stiffness than the spring 47, for the purposes to be presently more fully described. Suitably attached to the lower end of the said spring 57 is another link or rod 58, the lower end-portion of which is suitably attached, by means of a pivot 59, to any ordinary and well-known foot-treadle 60. Thus it will be seen, that when the operator depresses the foot-treadle, the spring 57 being stiffer than the spring 47, its coils will not become distended, until such time as will be hereinafter more fully specified, but the bell-crank will be brought from the position represented in Figs. 1 and 4, to the position shown in Fig. 3 of the drawings, thereby compressing the coils of the spring 47 and sliding the shaft or spindle 25 in its forward direction, while revolving, until the female clamping member or element 39 registers with the master or male supporting member or element 20, as will be clearly evident.

From an inspection of the several figures of the drawings, it will be seen, that the reference-character 61 indicates a suitably shaped block or knife-holder, the said block being provided with a laterally extending duct 62 in which is arranged the shank 63 of a knife or cutter 64 having the sharp cutting edge 65. The said shank 63 is secured in an adjustable relation within the duct of the block 61 by means of suitable set-screws 66, and the angular arrangement of the block 61 and the knife or cutter is such that the blade or knife is tangent to the revolving marginal edges of the master or male member 20, or, in other words, the vertical plane of the knife or cutter is at an angle of 45 degrees to the vertical plane of the longitudinal axes of the two spindles or shafts 14 and 25, so that the cutting edges of the knife will cut into the leather corner-piece 67, see Fig. 8 of the drawings, at right angles across the planes of the faces of the three angular sides of the corner-piece. The said block 61 is mounted upon the upper end-portions of a pair of vertically moving rods 68 and 69, the lower portions of the said rods extending through suitably disposed openings, as 70 and 71, in the bed-plate 2 and forming bearings for the said rods 68 and 69, and the said rods being joined at their free end beneath suitable hubs 73 formed upon said bed-plate by means of a bar or plate 72, or other suitable fastening means. Extending from the said bar or plate 72 is a ring or hook 74 to which is attached a rod or link 75 which extends downwardly through an opening in the work-bench, and has secured upon its lower end-portion, by means of a set-screw 76, or other fastening means, a bar or plate 77. This bar or plate 77 is also made with an opening or hole 78, as indicated in dotted outline in Figs. 1 and 3 of the drawings, into and through which the previously mentioned rod or link 56, which is connected with the foot-treadle, extends and operates in the manner to be presently described. Upon the rod 68 is adjustably secured, by means of a set-screw 67, a collar 79, to limit the downward movement of the rods 68 and 69, and of the knife or cutter; and, encircling the rod 69, between the bed-plate 2 and the block 61, is a coiled spring 80 for returning the parts to their normal initial positions upon releasing the pressure from the foot-treadle.

Having thus in a general manner described one arrangement and combination of devices and parts embodying the principles of my novel cutting and trimming apparatus, I will now briefly set forth the operations of the mechanisms for cutting and trimming the marginal edge-portions of the leather corner-pieces, such as are used upon coat-cases and the like.

Figure 6:
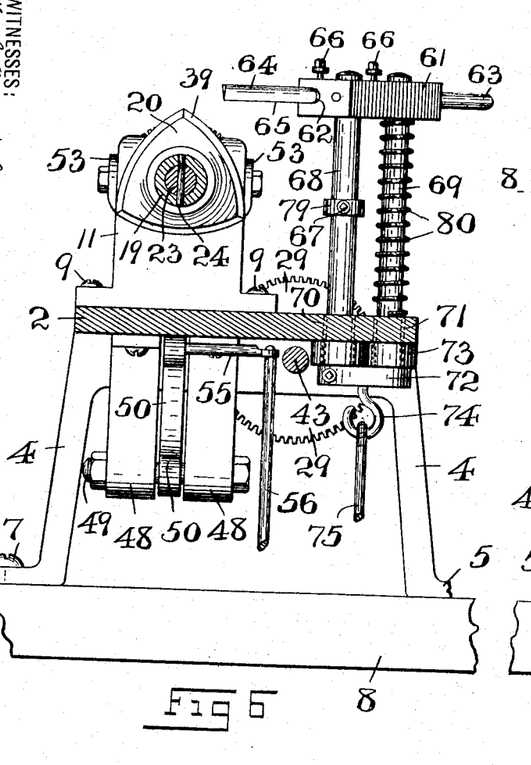
Fig. 6 is a transverse vertical section, said section being taken on line 6—6 in said Fig. 2, looking in the direction of the arrow $x$.
Figure 7:
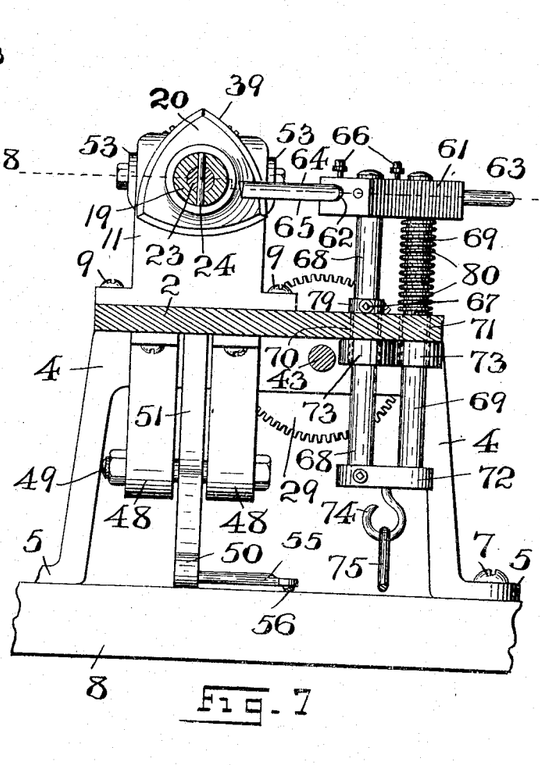
Fig. 7 is a similar section, taken in the same vertical plane, but showing the cutting knife in its descended position with relation to the revolving corner-piece-support.
Figure 8:
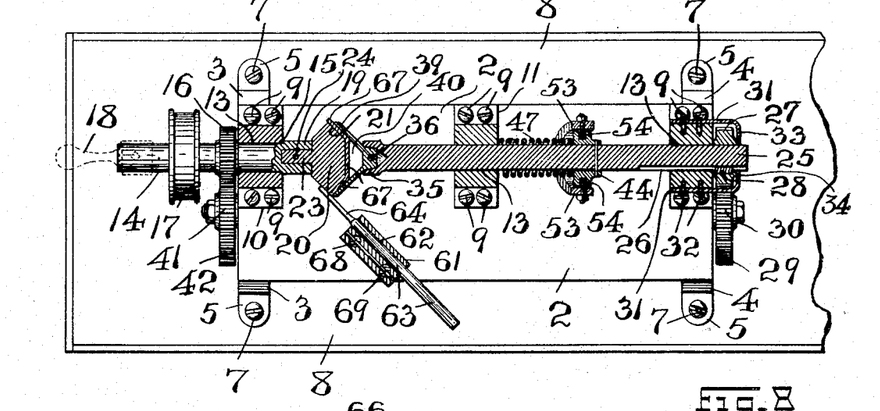
Fig. 8 is a horizontal sectional representation of the machine, said section being taken on a plane through line 8—8 in said Fig. 7, but said view being made on a smaller scale.

Having set the shafts 14 and 25 in motion, by means of the pulley or handle, and the shaft beneath the bed-plate and the gear mechanisms at the respective ends of the bed-plate, a corner-piece, with its rough marginal edges is placed either upon the master or male member, or may be arranged in the hollow part of the female member, as may be desired. The operator thereupon depresses the foot-treadle whereby the shaft or spindle 25 is moved forwardly and the corner-piece is securely clamped or held between the male and female members, substantially as shown in Fig. 8 of the drawings, the connected parts continuing to revolve, as will be clearly evident. The operator continuing to still further depress the foot-treadle, the parts having been brought into the positions indicated in Fig. 3 of the drawings, and the further forwardly sliding movement of the shaft or spindle 25 and the pivotal movement of the bell-crank having ceased, the rod or link 58 now acts upon the bar or plate 77, thereby, while the coils of the spring 57 are distended, causing the rod or link 75 to exert a downward pull upon the plate or bar 72. This action causes the rods 68 and 69 to move downwardly, until the collar 79 is brought down against the bed-plate 2, thereby arresting the downward movements of said rods. The knife or cutter is thereupon moved from its normally raised position, indicated in Figs. 5 and 6, to the position shown in Fig. 7 of the drawings, the knife-edge cutting directly into the exposed edge-portion of the corner-piece and perfectly cutting or trimming away the entire rough edges of the three sides of the corner-piece during the revolutions of the parts. As soon as the said edges of the corner-piece have been cut away, the operator removes the pressure from the foot-treadle, whereupon the several springs return the several parts to their normal initial positions; and the machine is once more ready for the next cutting or trimming operation.

I am fully aware that changes may be made in the arrangements and combinations of the various devices and parts, as well as in the details of the construction of the said parts, without departing from the scope of my present invention as defined in the appended claims. Hence, I do not limit my present invention to the exact arrangements and combinations of the devices and parts as set forth in the accompanying specification, nor do I confine myself to the exact details of the construction of the said parts as illustrated in the accompanying drawings.

I claim:—

1. In an apparatus for cutting and trimming the edge-portions of triangular corner-pieces, the combination with a bed-plate provided with bearings, of a pair of revolving spindles mounted in said bearings, said spindles being in alinement with each other, and one of said spindles having a sliding motion toward the other spindle, a male suporting member upon one of said spindles, the said male supporting member being of a pyramidal form, a female clamping member upon the other spindle, said female member being provided with a hollow three-sided receiving portion, means for sliding said last-mentioned spindle forwardly so that said female member can be made to register with said male member, and means for revolving said spindles and a resiliently mounted knife-holder provided with a knife adapted to be moved against the edge of the clamped corner-pieces and operating in conjunction with the said male supporting member and said female clamping member, substantially as and for the purposes set forth.

2. In an apparatus for cutting and trimming the edge-portions of triangular corner-pieces, the combination with a bed-plate provided with bearings, of a pair of revolving spindles mounted in said bearings, said spindles being in alinement with each other, and one of said spindles having a sliding motion toward the other spindle, a male supporting member upon one of said spindles, the said male supporting member being of a pyramidal form, a female clamping member upon the other spindle, said female member being provided with a hollow three-sided receiving portion, means for sliding said last-mentioned spindle forwardly so that said female member can be made to register with said male member, means for revolving said spindles, and a cutter for trimming the exposed edge-portions of the corner-piece which is clamped between said registering male and female members, and a resiliently mounted knife-holder provided with a knife adapted to be moved against the edge of the clamped corner-pieces and operating in conjunction with the said male supporting member and said female clamping member, substantially as and for the purposes set forth.

3. In an apparatus for cutting and trimming the edge-portions of triangular corner-pieces, the combination with a bed-plate provided with bearings, of a pair of revolving spindles mounted in said bearings, said spindles being in alinement with each other, and one of said spindles having a sliding motion toward the other spindle, a male supporting member upon one of said spindles, the said male supporting member being of a pyramidal form, a female clamping member upon the other spindle, said female member being provided with a hollow three-sided receiving portion, means for sliding said last-mentioned spindle forwardly so that said female member can be made to register with said male member, and means for causing said two spindles to revolve in the same direction and with uniform speed, and a resiliently mounted knife-holder provided with a knife adapted to be moved against the edge of the clamped corner-pieces and operating in conjunction with the said male supporting member and said female clamping member, substantially as and for the purposes set forth.

4. In an apparatus for cutting and trimming the edge-portions of triangular corner-pieces, the combination with a bed-plate provided with bearings, of a pair of revolving spindles mounted in said bearings, said spindles being in alinement with each other, and one of said spindles having a sliding motion toward the other spindle, a male supporting member upon one of said spindles, the said male supporting member being of a pyramidal form, female clamping member upon the other spindle, said female member being provided with a hollow three-sided receiving portion, means for sliding said last-mentioned spindle forwardly so that said female member can be made to register with said male member, means for causing said two spindles to revolve in the same direction and with uniform speed, and a cutter for trimming the exposed edge-portions of the corner-piece which is clamped between said registering male and female members, and a resiliently mounted knife-holder provided with a knife adapted to be moved against the edge of the clamped corner-pieces and operating in conjunction with the said male supporting member and said female clamping member, substantially as and for the purposes set forth.

5. In an apparatus for cutting and trimming the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same direction and with uniform speed.

6. In an apparatus for cutting and trimming the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, and means for causing the two spindles to revolve in the same direction and with uniform speed, and a cutter for trimming the exposed edge-portions of the corner-piece which is clamped between said registering male and female members.

7. In an apparatus for cutting and trimming the edges of corner-pieces, the combination with a bed-plate provided with bearings, of a pair of spindles mounted in said bearings, a male supporting member upon one of said spindles, a female clamping member upon the other spindle, means for sliding said last-mentioned spindle forwardly so that said female member can be made to register with said male member, and means for causing said two spindles to revolve in the same direction and with uniform speed, consisting of a shaft mounted in bearings beneath the bed-plate, a gear-wheel upon each end-portion of said shaft, said gear-wheels being of the same size, a gear-wheel upon said male-member-carrying spindle, and a gear-wheel upon said female member-carrying spindle, said gears being of the same size, and a toothed idler meshing with each pair of said gears, substantially as and for the purposes set forth.

8. In an apparatus for cutting and trimming the edges of corner-pieces, the combination with a bed-plate provided with bearings, or a pair of spindles mounted in said bearings, a male supporting member upon one of said spindles, a female clamping member upon the other spindle, means for sliding said last-mentioned spindle forwardly so that said female member can be made to register with said male member, means for causing said two spindles to revolve in the same direction and with uniform speed, consisting of a shaft mounted in bearings beneath the bed-plate, a gear-wheel upon each end-portion of said shaft, said gear-wheels being of the same size, a gear-wheel upon said male-member-carrying spindle, and a gear-wheel upon said female member-carrying spindle, said gears being of the same size, and a toothed idler meshing with each pair of said gears, and a cutter for trimming the exposed edge-portions of the corner-piece which is clamped between said registering male and female members.

9. In an apparatus for cutting and trimming the edges of corner-pieces, the combination with a bed-plate provided with bearings, of a pair of spindles mounted in said bearings, a male supporting member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link, and the bell-crank for sliding said spindle which is provided with said female member forwardly so that said female member can be made to register with said male member, and means for causing the two spindles to revolve in the same direction and with uniform speed, consisting of a shaft mounted in bearings beneath the bed-plate, a gear-wheel upon each end-portion of said shaft, said gear-wheels being of the same size, a gear-wheel upon said male member-carrying spindle, and a gear-wheel upon said female member-carrying spindle, said gears being of the same size, and a toothed idler meshing with each pair of said gears, substantially as and for the purposes set forth.

10. In an apparatus for cutting and trimming the edges of corner-pieces, the combination with a bed-plate provided with bearings, of a pair of spindles mounted in said bearings, a male supporting-member upon one of said spindles, a female clamping member upon the other spindle, a coiled spring and a grooved collar mounted upon said last-mentioned spindle, a bell-crank having one end-portion in operative engagement with said grooved collar, a link connected with the other end of said bell-crank, a foot-treadle for actuating said link and the bell-crank for sliding said spindle which is provided with said female member forwardly so that said female member can be made to register with said male member, means for causing the two spindles to revolve in the same direction and with uniform speed, consisting of a shaft mounted in bearings beneath the bed-plate, a gear-wheel upon each end-portion of said shaft, said gear-wheels being of the same size, a gear-wheel upon said male member-carrying spindle, and a gear-wheel upon said female member-carrying spindle, said gears being of the same size, and a toothed idler meshing with each pair of said gears, substantially as and for the purposes set forth.

11. In an apparatus for cutting and trimming the edges of corner-pieces, the combination with a bed-plate provided with bearings, of a pair of spindles mounted in said bearings, a male-supporting member upon one of said spindles, a female clamping member upon the other spindle, a vertically moving knife-holding block normally located at a point above said male and female members, a knife extending from said block, means for revolving said two spindles, and means for sliding the female member-carrying spindle forwardly so that the female member can be made to register with the male member and in consequence moving said knife-block and knife in a downward direction against the side of said male member, substantially as and for the purposes set forth.

12. In an apparatus for cutting and trimming the edges of corner-pieces, the combination with a bed-plate provided with bearings, of a pair of spindles mounted in said bearings, a male-supporting member upon one of said spindles, a female clamping member upon the other spindle, a vertically moving knife-holding block normally located at a point above said male and female members, a knife extending from said block, means for revolving said two spindles, and means for sliding the female member-carrying spindle forwardly so that the female member can be made to register with the male member and in consequence moving said knife-block and knife in a downward direction against the side of said male member, a stop for limiting the downward movement of said knife-block and knife, and a spring for returning the same into their normally raised positions, substantially as and for the purposes set forth.

13. In an apparatus for cutting and trimming the edges of corner-pieces, the combination with a bed-plate provided with bearings, of a pair of spindles mounted in said bearings, a male-supporting member upon one of said spindles, a female clamping member upon the other spindle, a vertically moving knife-holding block normally located at a point above said male and female members, a knife extending from said block, means for revolving said two spindles, a grooved collar and a coiled spring mounted upon said female member-carrying spindle, a bell-crank having one end-portion in operative engagement with said grooved collar, a link connected with the other end of said bell-crank, a spring attached to said link, said spring being of greater stiffness than the spring upon said female member carrying spindle, a second link connected with said first-mentioned spring, a foot-treadle for actuating said links and the bell-crank for sliding said spindle which is provided with said female member forwardly so that said female member can be made to register with said male-member, and a rod-connection between said knife-holding block and the link which is attached to said foot-treadle for moving said knife-block and a knife in a downward direction against the side of said male member, substantially as and for the purposes set forth.

14. In an apparatus for cutting and trimming the edges of corner-pieces, the combination with a bed-plate provided with bearings, of a pair of spindles mounted in said bearings, a male-supporting member upon one of said spindles, a female-clamping member upon the other spindle, a vertically moving knife-holding block normally located at a point above said male and female members, a knife extending from said block, means for revolving said two spindles, a grooved collar and a coiled spring mounted upon said female member-carrying spindle, a bell-crank having one end-portion in operative engagement with said grooved collar, a link connected with the other end of said bell-crank, a spring attached to said link, said spring being of greater stiffness than the spring upon said female member carrying spindle, a second link connected with said first-mentioned spring, a foot-treadle for actuating said links and the bell-crank for sliding said spindle which is provided with said female member forwardly so that said female member can be made to register with said male-member, a pair of rods extending downwardly from said knife-block, a stop on one of said rods, and a spring encircling the other rod, a connecting plate between the lower ends of said rods, and a rod-connection between said connecting plate and the link which is attached to said foot-treadle for moving said knife-block and knife in a downward direction against the side of said male member, substantially as and for the purposes set forth.

15. In an apparatus for cutting and trimming the edges of corner-pieces, the combination with a bed-plate provided with bearings, of a pair of spindles mounted in said bearings, a male supporting member upon one of said spindles, a female clamping member upon the other spindle, a vertically moving knife-holding block normally located at a point above said male and female members, a knife extending from said block, means for causing the two spindles to revolve in the same direction and with uniform speed, consisting of a shaft mounted in bearings beneath said bed-plate, a gear-wheel upon each end-portion of said shaft, said gear-wheels being of the same size, a gear-wheel upon said male member-carrying spindle, a gear-wheel upon said female-carrying spindle, said gears being of the same size, a toothed idler meshing with each pair of said gears, and means for sliding the female member-carrying spindle forwardly so that the female member can be made to register with the male member and in sequence moving the knife-block and knife in a downward direction against the side of the male member, substantially as and for the purposes set forth.

16. In an apparatus for cutting and trimming the edges of corner-pieces, the combination with a bed-plate provided with bearings, of a pair of spindles mounted in said bearings, a male supporting member upon one of said spindles, a female clamping member upon the other spindle, a vertically moving knife-holding block normally located at a point above said male and female members, a knife extending from said block, means for causing the two spindles to revolve in the same direction and with uniform speed, consisting of a shaft mounted in bearings beneath said bed-plate, a gear-wheel upon each end-portion of said shaft, said gear-wheels being of the same size, a gear-wheel upon said male member-carrying spindle, a gear-wheel upon said female-carrying spindle, said gears being of the same size, a toothed idler meshing with each pair of said gears, and means for sliding the female member-carrying spindle forwardly so that the female member can be made to register with the male member and in sequence moving the knife-block and knife in a downward direction against the side of the male member, a stop for limiting the downward movement of said knife-block and knife, and a spring for returning the same into their normally raised positions, substantially as and for the purposes set forth.

17. In an apparatus for cutting and trimming the edges of corner-pieces, the combination with a bed-plate provided with bearings, of a pair of spindles mounted in said bearings, a male supporting member upon one of said spindles, a female clamping member upon the other spindle, a vertically moving knife-holding block normally located at a point above said male and female members, a knife extending from said block, means for causing the two spindles to revolve in the same direction and with uniform speed, consisting of a shaft mounted in bearings beneath said bed-plate, a gear-wheel upon each end-portion of said shaft, said gear-wheels being of the same size, a gear-wheel upon said male member-carrying spindle, a gear-wheel upon said female-carrying spindle, said gears being of the same size, a toothed idler meshing with each pair of said gears, a grooved collar and a coiled spring mounted upon said female member-carrying spindle, a bell-crank having one end-portion in operative engagement with said grooved collar, a link connected with the other end of said bell-crank, a spring attached to said link, said spring being of greater stiffness than the spring upon said female member-carrying spindle, a second link connected with said first-mentioned spring, a foot-treadle for actuating said links and the bell-crank for sliding said spindle which is provided with said female member forwardly so that said female member can be made to register with said male member, and a rod-connection between said knife-holding block and the link which is attached to said foot-treadle for moving said knife-block and knife in a downward direction against the side of said male member, substantially as and for the purposes set forth.

18. In an apparatus for cutting and trimming the edges of corner-pieces, the combination with a bed-plate provided with bearings, of a pair of spindles mounted in said bearings, a male supporting member upon one of said spindles, a female clamping member upon the other spindle, a vertically moving knife-holding block normally located at a point above said male and female members, a knife extending from said block, means for causing the two spindles to revolve in the same direction and with uniform speed, consisting of a shaft mounted in bearings beneath said bed-plate, a gear-wheel upon each end-portion of said shaft, said gear-wheels being of the same size, a gear-wheel upon said male member-carrying spindle, a gear-wheel upon said female-carrying spindle, said gears being of the same size, a toothed idler meshing with each pair of said gears, a grooved collar and a coiled spring mounted upon said female member-carrying spindle, a bell-crank having one end-portion in operative engagement with said grooved collar, a link connected with the other end of said bell-crank, a spring attached to said link, said spring being of greater stiffness than the spring upon said female member-carrying spindle, a second link connected with said first-mentioned spring, a foot-treadle for actuating said links and the bell-crank for sliding said spindle which is provided with said female member forwardly so that said female member can be made to register with said male member, a pair of rods extending downwardly from said knife-block, a stop on one of said rods, and a spring encircling the other rod, a connecting plate between the lower ends of said rods, and a rod-connection between said connecting plate and the link which is attached to said foot-treadle for moving said knife-block and knife in a downward direction against the side of said male member, substantially as and for the purposes set forth.

19. In an apparatus for cutting and trimming the edge-portions of triangular corner-pieces, in combination, a spindle, a male supporting member upon said spindle, a second spindle, said spindles being adapted to revolve and being in alinement with each other, said second spindle having a sliding motion toward the other spindle, a female clamping member upon said second spindle, said female member being provided with a hollow three-sided receiving portion, means for revolving said spindles, a resiliently mounted and vertically movable knife-carrying block, a knife extending from said block, and means for moving said knife-carrying block downwardly against the side of said male supporting member.

20. In an apparatus for cutting and trimming the edge-portions of triangular corner-pieces, in combination, a spindle, a male supporting member upon said spindle, the said male supporting member being of a pyramidal form, a second spindle, said spindles being adapted to revolve and being in alinement with each other, said second spindle having a sliding motion toward the other spindle, a female clamping member upon said second spindle, said female member being provided with a hollow three-sided receiving portion, means for revolving said spindles, a resiliently mounted and vertically movable knife-carrying block, a knife extending from said block, and means for moving said knife-carrying block downwardly against the side of said male supporting member, a stop for limiting the downward movement of said knife-block and knife, and a spring for returning the same into their normally raised positions, substantially as and for the purposes set forth.

21. In an apparatus for cutting and trimming the edge-portions of triangular corner-pieces, the combination with a resiliently mounted and vertically moving cutter, of a spindle, a male supporting member upon said spindle, the said male supporting member being of a pyramidal form, a second spindle, said spindles being adapted to revolve and being in alinement with each other, said second spindle having a sliding motion toward the other spindle, a female clamping member upon said second spindle, said female member being provided with a hollow three-sided receiving portion, means for revolving said two spindles, and an actuating means for sliding the female member-carrying spindle forwardly so that the female member can be made to register with the male member and in sequence moving said cutter in a downward direction against the side of said male member.

22. In an apparatus for cutting and trimming the edges of corner-pieces, the combination with a vertically moving cutter, of a spindle, a male supporting member upon said spindle, a second and slidably arranged spindle, a female clamping member upon said second spindle, means for revolving said two spindles, and an actuating means for revolving said two spindles, and an actuating means for sliding the female member-carrying spindle forwardly so that the female member can be made to register with the male member and in sequence moving said cutter in a downward direction against the side of said male member, a pair of downwardly extending rods with which a portion of said actuating means is connected, a stop on one of said rods for limiting the downward movement of said cutter, and a spring encircling the other rod for returning said cutter into its normally raised position.

23. In an apparatus for cutting and trimming the edges of corner-pieces, the combination with a vertically moving cutter, of a spindle, a male supporting member upon said spindle, a second and slidably arranged spindle, a female clamping member upon said second spindle, means for revolving said two spindles, a grooved collar and a coiled spring mounted upon said female member-carrying spindle, a bell-crank having one end-portion in operative engagement with said grooved collar, a link connected with the other end of said bell-crank, a spring attached to said link, said spring being of greater stiffness than the spring upon said female member-carrying spindle, a second link connected with said first-mentioned spring, a foot-treadle for actuating said links and the bell-crank for sliding said spindle which is provided with said female member forwardly so that said female member can be made to register with said male member, and a rod-connection between said cutter and the link which is attached to said foot-treadle for moving said cutter in a downward direction against the side of said male supporting member, substantially as and for the purposes set forth.

24. In an apparatus for cutting and trimming the edges of corner-pieces, the combination with a vertically moving cutter, of a spindle, a male supporting member upon said spindle, a second and slidably arranged spindle, a female clamping member upon said second spindle, means for revolving said two spindles, a grooved collar and a coiled spring mounted upon said female member-carrying spindle, a bell-crank having one end-portion in operative engagement with said grooved collar, a link connected with the other end of said bell-crank, a spring attached to said link, said spring being of greater stiffness than the spring upon said female member-carrying spindle, a second link connected with said first-mentioned spring, a foot-treadle for actuating said links and a bell-crank for sliding said spindle which is provided with said female member forwardly so that said female member can be made to register with said male member, a pair of rods extending downwardly from said cutter, a stop on one of said rods, and a spring encircling the other rod, a connecting plate between the lower ends of said rods, and a rod-connection between said connecting plate and the link which is attached to said foot-treadle for moving said cutter in a downward direction against the side of said male supporting member, substantially as and for the purposes set forth.

25. The combination with a bed-plate, of a slidable spindle, a coiled spring upon said spindle, a bell-crank having an end-portion in engagement with an end of said spring for compressing said spring, a link connected with the other end of said bell-crank, a second spring attached to said link, said second spring being of greater stiffness than said first-mentioned spring, a rod depending from said second mentioned spring, means for actuating said rod, another rod-connection connected with said first-mentioned rod, and mechanism connected with said rod-connection adapted to be actuated when the coils of said second-mentioned spring become distended.

In testimony, that I claim the invention set forth above I have hereunto set my hand this 8th day of October, 1908.

CORNELIUS J. LYSAGHT.

Witnesses:
 FREDK. C. FRAENTZEL,
 F. H. W. FRAENTZEL.